UNITED STATES PATENT OFFICE.

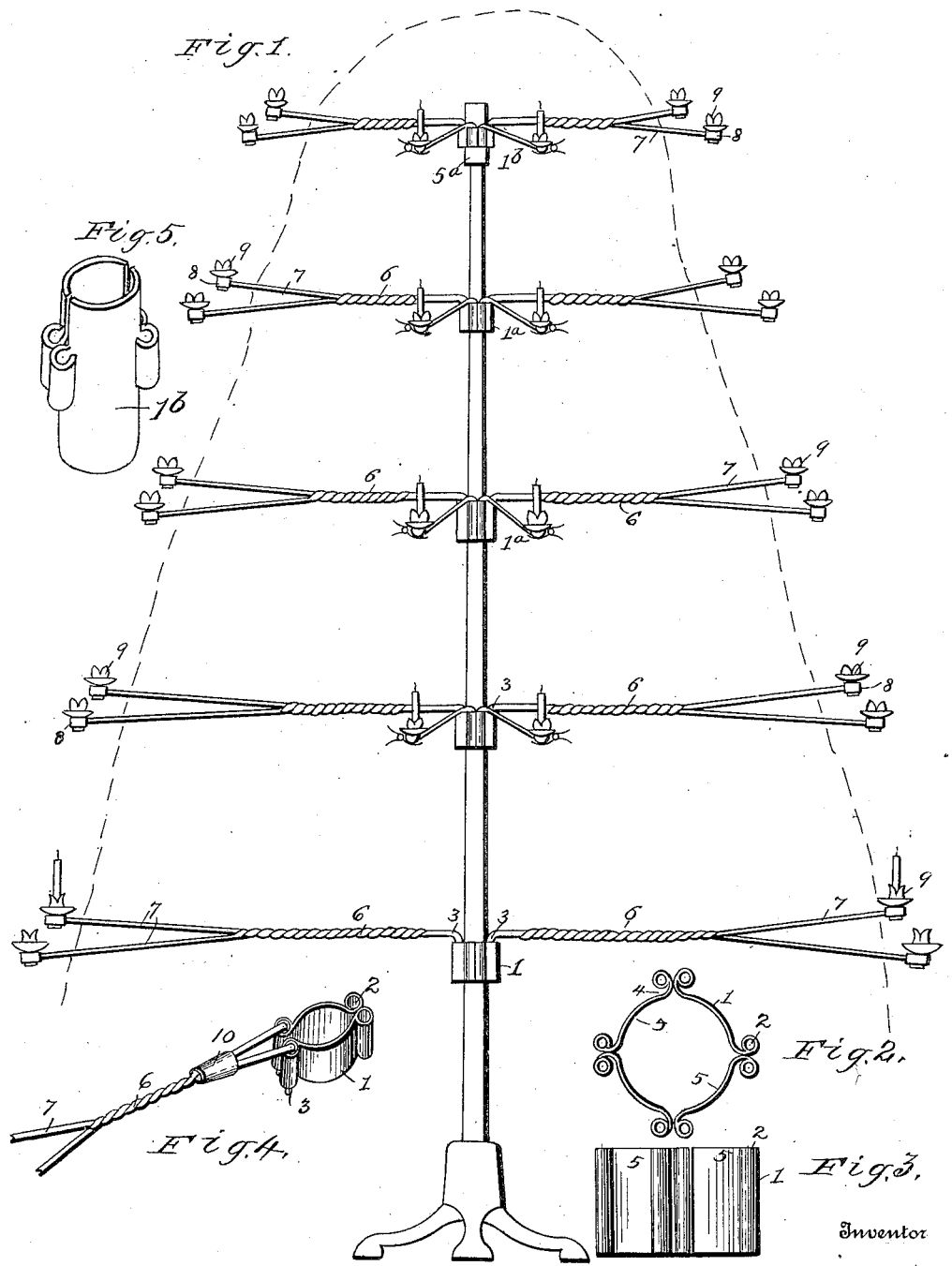

GUSTAV KNITTEL, OF CHICAGO, ILLINOIS.

CANDLE-HOLDER.

No. 887,099.  Specification of Letters Patent.  Patented May 12, 1908.

Application filed September 3, 1907. Serial No. 391,134.

*To all whom it may concern:*

Be it known that I, GUSTAV KNITTEL, citizen of the United States, residing at Chicago, in the county of Cook and State of Illinois, have invented certain new and useful Improvements in Candle-Holders, of which the following is a specification.

In placing candles upon Christmas trees considerable annoyance is commonly occasioned in causing the candles to assume a correct position, owing to the fact that the branches of the tree are already weighted down with the other ornaments. It is also found difficult to so place the candles that the flames will not come in contact with the foliage of the tree.

The object of the present invention has been to obviate these difficulties by the provision of a novel form of bracket having an inner end thereof detachably applied to the tree trunk, while the other end projects beyond the branches and forms a support for the candles.

For a full description of the invention and the merits thereof, reference is to be had to the following description and accompanying drawings, in which:

Figure 1 is a side elevation showing the application of the device; Fig. 2 is a plan view of one of the clamps; Fig. 3 is a side elevation of the same; Fig. 4 is a detail perspective view showing a modification. Fig. 5 is a detail view of the modified form of clamp designed to be employed at the top of the tree.

Corresponding and like parts are referred to in the following description and indicated in all the views of the drawings by the same reference characters.

In general the device comprises a plurality of clamps of various sizes applied to the tree-trunk at various points in the length of the same, and brackets detachably connected to the clamps and projecting outwardly between the branches of the tree. These clamps are indicated at 1 and are in the nature of split rings designed to encircle the tree-trunk and are provided with sockets 2 designed to receive the downwardly extending fingers 3 upon the inner extremities of the brackets 4. In the specific formation of the clamps 1, it will be observed that the same are formed of a plurality of spring strips 5 having the end portions thereof soldered or otherwise rigidly connected, the extremities of the strips extending beyond the soldered portion and being returned upon themselves to form the sockets 2 which are arranged in pairs and are located exterior of the clamping rings. The adjacent ends of one pair of the spring strips are not connected, but are merely held together by the spring action of the remaining strips and are swung apart when applying the clamp to a tree trimmer or removing it therefrom. Any desired number of the strips 5 may be utilized in the formation of the clamping rings 1, and in the present instance, the larger rings located at the base of the tree comprise four of the spring strips, while the intermediate clamps 1$^a$ are formed with three of the strips 5 and the smaller clamps 1$^b$ are formed with two of the said spring strips. Under some circumstances, it may be found desirable in the smaller forms of clamps 1$^b$ to extend the strips 5 upwardly and downwardly beyond the sockets 2, as indicated at 5$^a$.

The brackets 4 are of various sizes, the longer brackets being located at the base of the tree while the smaller ones are placed at the top thereof. Each of the brackets 4 is formed of two lengths of wire which are twisted together at an intermediate point, as indicated at 6, the inner ends of the two wires being bent downwardly to form the spaced fingers 3 designed to engage the sockets 2, while the outer ends of the wires are diverged to form arms 7 which terminate in the enlarged tips 8 to which ordinary candle holders may be attached, such as those shown at 9. These arms 7 are designed to project slightly beyond the branches so as to hold the candles in such a position that the flame thereof will not come into contact with the foliage of the tree, and the said arms may be bent at any desired angle to each other.

A slight modification is shown in Fig. 4, in which the inner ends of the two wires constituting the bracket are diverged from each other and receive a sleeve 10 which is slidably mounted thereon. When this sleeve 10 is moved outwardly, the spring action of the wires throws the fingers 3 apart, while when the sleeve is moved inwardly, the fingers are drawn together and may be of assistance in clamping the rings 1 securely upon the tree-trunk.

Having thus described the invention, what is claimed as new is:

1. In a candle support of the character described, the combination of a split clamping ring, a socket being carried by the clamping ring upon each side of the split, and a candle supporting bracket embodying means for coöperating with the two sockets to draw the ends of the split ring toward each other.

2. In a candle support of the character described, the combination of a split clamping ring formed of a plurality of strips having their end portions connected, the extremities of the strips projecting beyond the said connected portions of the ends and carrying sockets arranged in pairs, one of the sockets being located upon each side of the split, and candle supporting brackets each of which is provided with a pair of fingers for engaging the before mentioned sockets.

3. In a candle support of the character described, the combination of a split clamping ring formed of a plurality of strips having their end portions connected, the extremities of the strips projecting beyond the said connected portions of the ends and being returned to form sockets arranged in pairs, one of the sockets being located upon each side of the split, and candle supporting brackets each of which is formed with a pair of fingers for engaging the before mentioned sockets.

4. In a candle support of the character described, the combination of a split clamping ring, a socket being carried by the said clamping ring upon each side of the split, and a candle supporting bracket formed of two strips of material having intermediate portions thereof twisted together, the inner ends thereof being provided with downwardly extending fingers adapted to coöperate with the before mentioned sockets to draw the ends of the split ring together, while the outer ends constitute arms for supporting the candle.

In testimony whereof I affix my signature in presence of two witnesses.

GUSTAV KNITTEL. [L. S.]

Witnesses:
WALTER R. WEIBOLDT,
ANDREW HOLZER.